· # (12) United States Patent
Martin et al.

(10) Patent No.: US 7,513,270 B2
(45) Date of Patent: Apr. 7, 2009

(54) BALANCED SAFETY RELIEF VALVE

(75) Inventors: Kevin P. Martin, Boston, NY (US); Nelson R. Timm, Darien, NY (US)

(73) Assignee: Flow-Safe, Inc., Orchard Park, NY (US)

( * ) Notice: Subject to any disclaimer, the term of this patent is extended or adjusted under 35 U.S.C. 154(b) by 337 days.

(21) Appl. No.: 10/905,650

(22) Filed: Jan. 14, 2005

(65) Prior Publication Data

US 2006/0157116 A1 Jul. 20, 2006

(51) Int. Cl.
*F16K 21/10* (2006.01)
*F16K 41/00* (2006.01)

(52) U.S. Cl. .................... 137/514.5; 137/469; 251/214; 277/637; 277/642

(58) Field of Classification Search ................. 137/469, 137/514.5; 277/647, 657, 946, 637, 641, 277/642; 251/214
See application file for complete search history.

(56) References Cited

U.S. PATENT DOCUMENTS

| | | | | |
|---|---|---|---|---|
| 351,828 | A * | 11/1886 | Bushnell | 251/214 |
| 682,688 | A * | 9/1901 | Hart | 251/214 |
| 1,484,350 | A * | 2/1924 | Cusick | 251/214 |
| 1,949,150 | A | 2/1934 | Eplett | |
| 2,264,656 | A | 12/1941 | Briscoe et al. | |
| 2,504,470 | A * | 4/1950 | Trautman | 137/469 |
| 2,566,773 | A * | 9/1951 | Otis | 137/469 |
| 2,755,817 | A | 7/1956 | Barr | |
| 2,977,157 | A * | 3/1961 | Rich | 137/469 |
| 3,043,555 | A * | 7/1962 | Breher | 251/214 |
| 3,282,289 | A * | 11/1966 | Vick | 137/469 |
| 3,446,239 | A * | 5/1969 | Klenz | 137/469 |
| 3,487,852 | A * | 1/1970 | Kikendall | 137/514.5 |
| 3,544,064 | A * | 12/1970 | Carlin | 251/214 |
| 3,559,951 | A * | 2/1971 | Whiteman, Jr. | 251/214 |
| 3,561,776 | A * | 2/1971 | Wilson | 277/647 |
| 3,610,276 | A * | 10/1971 | Seelman et al. | 137/469 |
| 3,729,018 | A * | 4/1973 | Butterfield | 137/469 |
| 3,796,228 | A | 3/1974 | Bedo et al. | |
| 3,848,632 | A * | 11/1974 | Powell | 137/514 |
| 3,993,093 | A | 11/1976 | Mokveld | |
| 4,228,820 | A | 10/1980 | Deminski | |
| 4,321,945 | A * | 3/1982 | Chabat-Courrede | 137/514.7 |
| 4,362,184 | A | 12/1982 | Marabeas | |
| 4,384,705 | A * | 5/1983 | Kato | 251/214 |
| 4,553,564 | A * | 11/1985 | Baram | 251/214 |
| 4,658,847 | A * | 4/1987 | McCrone | 251/214 |
| 4,719,938 | A | 1/1988 | Pandorf | |
| 4,742,846 | A * | 5/1988 | DiBartolo | 137/514.5 |
| 5,782,259 | A | 7/1998 | Ledbetter et al. | |
| 5,842,501 | A | 12/1998 | Powell et al. | |
| 6,250,329 | B1 | 6/2001 | Rashidi | |
| 6,581,632 | B2 | 6/2003 | Walpole et al. | |
| 6,651,696 | B2 | 11/2003 | Hope et al. | |
| 6,668,853 | B2 | 12/2003 | Dean | |

* cited by examiner

*Primary Examiner*—John Rivell
(74) *Attorney, Agent, or Firm*—Simpson & Simpson, PLLC

(57) ABSTRACT

A safety relief valve provides for the equalization of back-pressure across a valve spindle by providing for flow of fluid between equal sized upper and lower surfaces of the spindle in order to render the valve set point independent of back-pressure, such that opening characteristics are controlled solely by the setting of the valve control spring. A seal preferably formed of TEFLON® is provided to prevent the escape of fluid from the valve body, which would otherwise adversely affect the pressure balance between the upper and lower surfaces.

4 Claims, 5 Drawing Sheets

BALANCED SAFETY RELIEF VALVE

FIELD OF THE INVENTION

This invention relates to a safety relief valve in a pressure relief system for a pressure vessel or for gas or liquid product pipelines, and more particularly to an improved spring-operated safety relief valve balanced against the effects of backpressure, wherein any pressure that may exist in the outlet piping when the valve is closed will exert a force on the closure member (spindle and seat) in an upward direction that is equal to and, therefore, in balance with, a downward force exerted on the closure member by outlet pressure to which the relief valve is exposed; this downward force normally having the effect of altering the valve set (opening) pressure were it not for the presence of an equal upward force. The seal that helps effect the balancing of upward and downward forces is of an improved configuration and preferably made of Teflon, which resists a wider range of chemical substances and temperature extremes than seals used in similar valve geometry in the prior art.

BACKGROUND OF THE INVENTION

Heretofore, balanced safety valves or balanced relief valves have been provided in pressure relief systems. While relief valves of various types have proven effective in applications where the fluid product is a benign gas or liquid at ambient or near-ambient temperatures and low to moderate pressures, they are not suitable for use in processes that are chemically incompatible with elastomer-type O-ring seals, or that have extremely low service temperatures or high backpressures. Most O-rings are not suitable for effective sealing when exposed to temperatures below approximately −60° F., and those known for their greatest chemically resistance, such as those of the perfluoroelastomer family, are not suitable below 0 to −20° F. The bellows in a balanced bellows-style valve may not be sufficiently durable in high backpressure applications.

Pressure relief discharge pipelines are frequently vented directly to atmosphere, where a conventional unbalanced spring-operated safety valve may be used due to the lack of backpressure present in the discharge lines that could vary the set pressure of the valve. Where the pressure relief system is handling hazardous or expensive fluids, discharge directly to atmosphere is not practical and may be contrary to environmental regulations. In these cases, one or more pressure relief valves would be installed such that each of the respective discharge pipelines is connected to a common header or manifold that leads to a central collection system or is routed back to an earlier stage of the fluid processing stream. The discharge header or manifold commonly contains a constant or variable level of pressure that may be due to design conditions of the fluid collection system or an actual discharge from one or more of the connected pressure relief valves. Such mainfold pressure, referred to in the industry as "superimposed backpressure," would exist all the way back to the discharge side of each of the connected pressure relief valves and exert a net force on the valve closure member (disc or spindle) that is proportional to the value of the pressure in combination with the net surface area of the valve closure member. That is, when superimposed backpressure is allowed to act on opposing closure member surfaces that are not of equal area, as in an unbalanced relief valve, the set pressure of the relief valve is caused to change. Variable set pressures at a pressure relief valve installation are generally undesirable as they may compromise the safety of the equipment (tank, pipe, pump, etc.) being protected and will otherwise cause inconsistent system operation.

In balanced pressure relief valves that rely on a metal bellows to achieve pressure balance of the main closure member, some designs place significant restrictions on the amount of allowable backpressure to which the bellows can be exposed, as the bellows tends to be of thin, light construction and may be easily subject to rupture.

What is needed, then, is a balanced safety relief valve in a pressure relief system for a pressure vessel or for gas or liquid product pipelines, more particularly an improved spring-operated safety relief valve balanced against the effects of backpressure, where the internal sealing configuration can withstand high system pressures and is chemically compatible with a wide variety of process fluids and low temperature conditions.

SUMMARY OF THE INVENTION

This application discloses a safety relief valve balanced against the effects of backpressure, with an internal sealing arrangement that has greater compatibility with noxious or corrosive chemical processes and low service temperatures than prior balanced relief valve designs.

It is an object of this invention to provide a balanced safety relief valve assembly for rapid relief of excess pressure in gas and liquid systems, whereby valve set pressure is maintained at a constant value when exposed to backpressure through use of a main closure member (spindle) that has equal sized opposing surface areas exposed to backpressure so that backpressure does not bias the spindle in any particular direction, and effects on valve set pressure are negated.

Another object of this invention is to provide a balanced safety relief valve assembly with an internal spindle seal made substantially of polytetrafluoroethylene (PTFE), which is chemically inert and compatible with a wide array of industrial gases and liquids and process temperatures. PTFE can perform an effective sealing function at temperatures down to approximately −423° F.

It is a further object of this invention to provide a balanced safety relief valve wherein the spindle seal dampens spindle movements when the valve is open, through a seal configuration that results in pressure-induced frictional forces between the outboard edge of the seal and the mating machined guide surface in the valve body.

It is a further object of this invention to provide a balanced safety relief valve compatible for operation on both gas and liquid systems, where the operation in gas service results in a rapid opening (popping action)—characteristic of the term 'safety valve' as used in the pressure relief industry—and where the operation in liquid service results in initial slight opening and modulation followed by popping open—characteristic of the term 'relief valve.'

It is a further object of this invention to provide a balanced safety relief valve that meets the material, design, and capacity certification requirements of Section VIII of the ASME Boiler and Pressure Vessel Code.

Other objects, features, and advantages of the invention will be apparent from the following drawings and specification.

DETAILED DESCRIPTION OF THE PREFERRED EMBODIMENT

Figure 1:
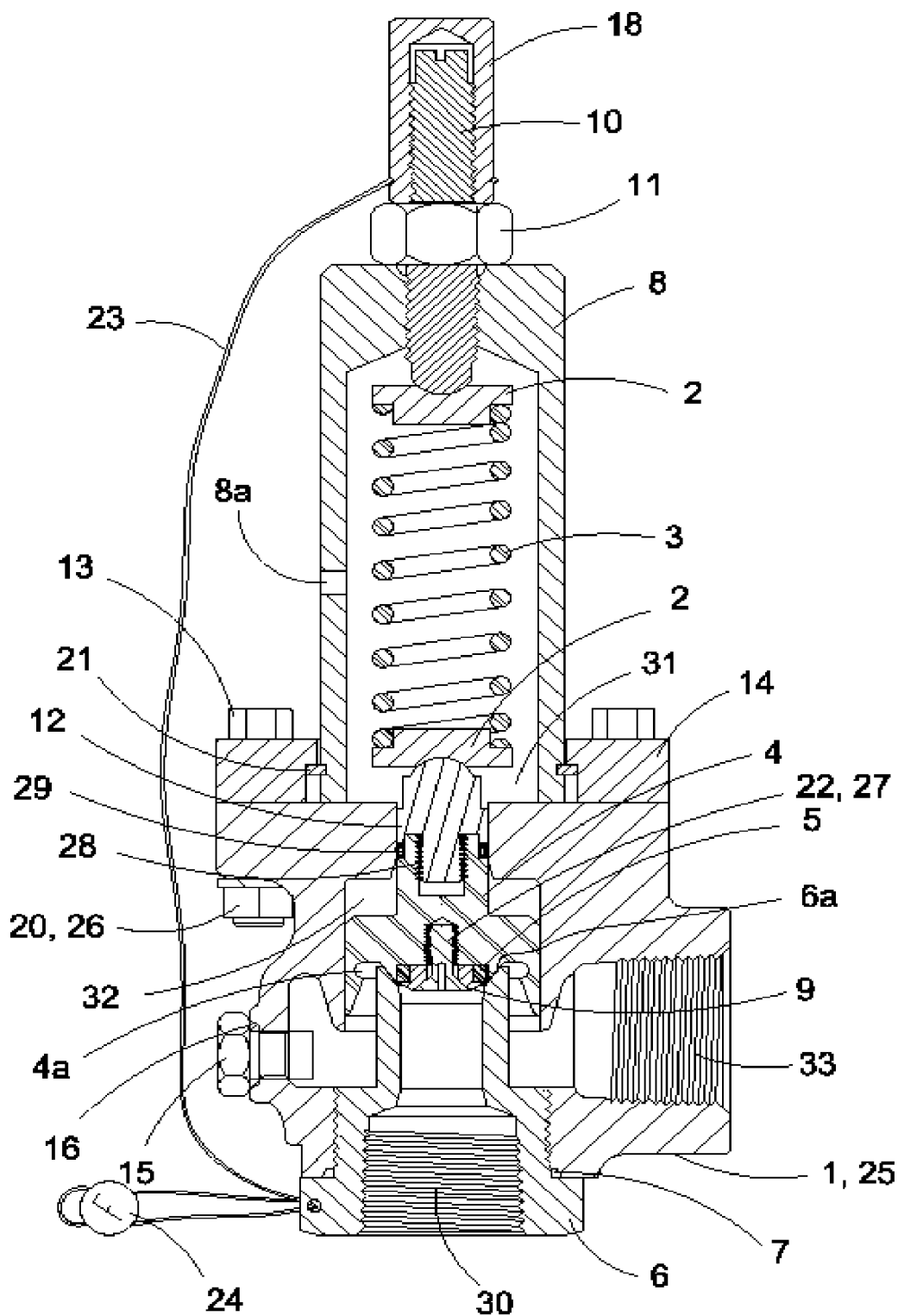
FIG. 1 is a side sectional view of the safety relief valve assembly of the present invention.
Figure 2:
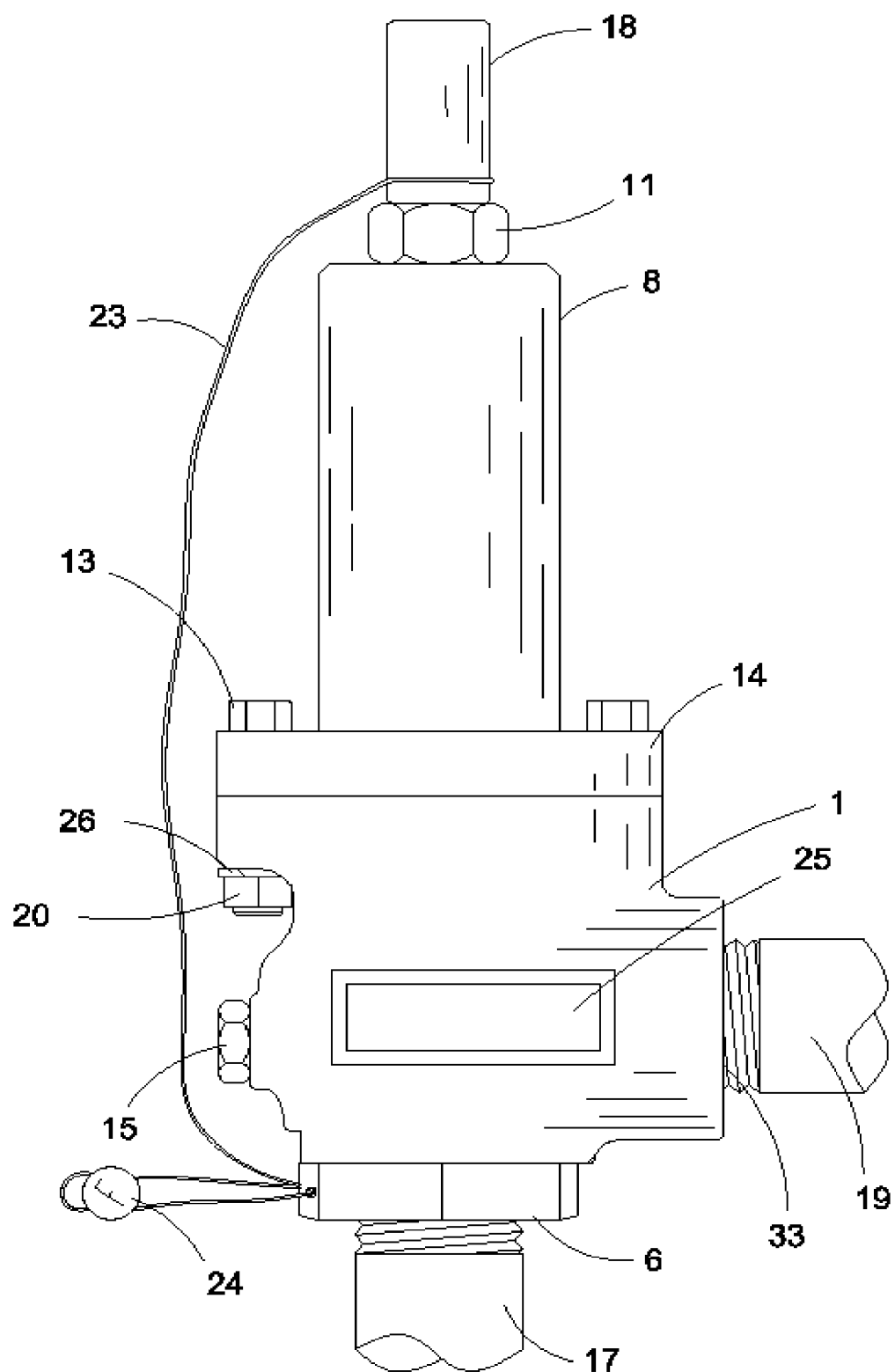
FIG. 2 is a side elevation view of the safety relief valve shown in FIG. 1 but additionally showing the valve assembly fitted with inlet and outlet conduits.

Referring now to the drawings for a better understanding of this invention, and more particularly to the embodiment shown in FIGS. 1 and 2, a balanced safety relief valve assembly is illustrated in a pressure relief system. The safety relief valve assembly has a valve body 1 fitted with an inlet bushing 6 formed with a threaded inlet 30 connected to system inlet pipeline 17 usually by an American National Standard Taper Pipe Thread (NPT) joint, or by an equivalent arrangement of pipe flanges with suitable bolting and gaskets. NPT connections screw together tightly with the use of wrenches, and are made leak-tight through the use of an appropriate sealing compound applied to the threads. Valve body 1 is also formed with threaded outlet 33 connected to an outlet pipeline 19 in an arrangement similar to threaded inlet 30. The entire valve assembly, except for seats and seals, is made of metal parts, normally an appropriate grade of stainless steel, although other metals can be used for special applications.

With the valve closed, seat seal 5 carried by spindle or valve member 4 makes a leak-tight seal against an angled machined nozzle surface 6a extending peripherily of the open top end of bushing 6. The seat seal 5 is a plastic material such as PTFE or harder plastics of suitable composition. The seat seal 5 is held in place in spindle 4 by an annular retainer 9, which in turn is retained in place with a screw 22. To help prevent loosening of this threaded joint, a locking thread insert 27 fits between the male threads of screw 22 and the female threads inside spindle 4. A spindle cap 12 is threaded into a thread upper opening 28 formed in the spindle. The spindle cap cooperates with spindle 4 to maintain spindle seal 29 in place.

Spindle 4 and spindle cap 12 are guided for vertical travel by concentric machined surfaces 1b of body 1, 4e of spindle 4 and 12a of spindle cap 12. A radial clearance is provided between these machined surfaces preferably of on the order of approximately 0.001 to 0.003 inch. This clearance is large enough for fluid present in the outlet chamber 33 to migrate along the outside diameter of spindle 4 to chamber 32. Use of corrosion-resistant stainless steel for these parts prevents buildup of corrosion products that would otherwise reduce these clearances over time.

It will be understood that the size of upwardly facing surface area 4b exposed to outlet pressure within chamber 32 is necessarily made equal to downwardly facing surface area 4c exposed to outlet pressure within flow outlet 33.

Figure 4:
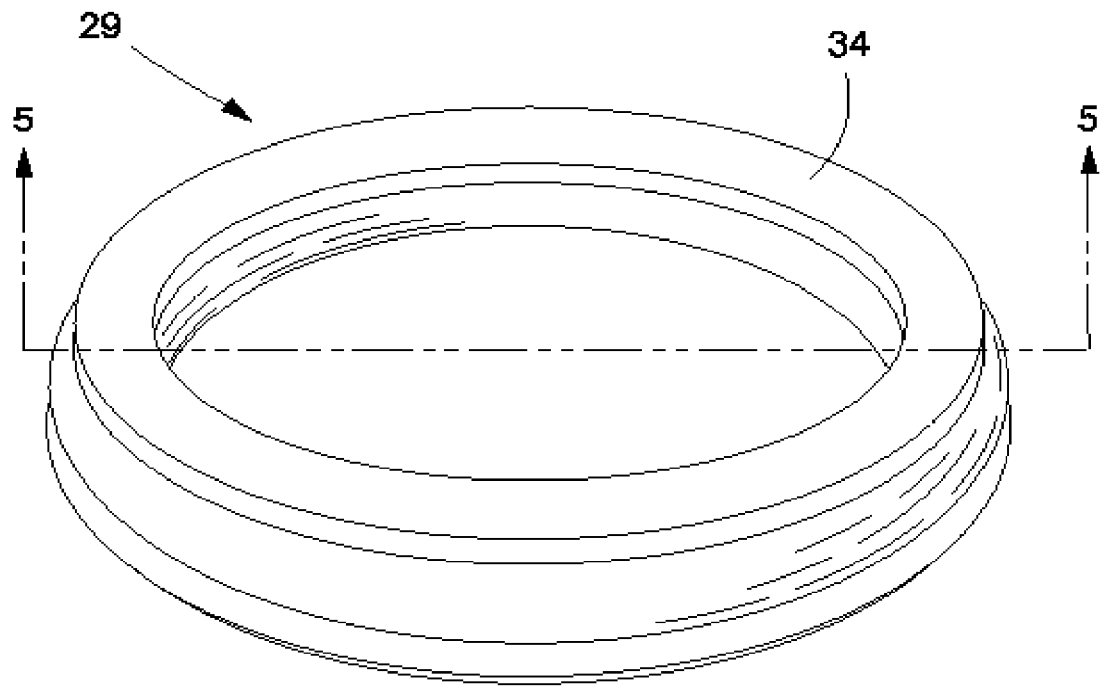
FIG. 4 is a general top view of the spindle seal shown in FIGS. 1 and 3.
Figure 5:
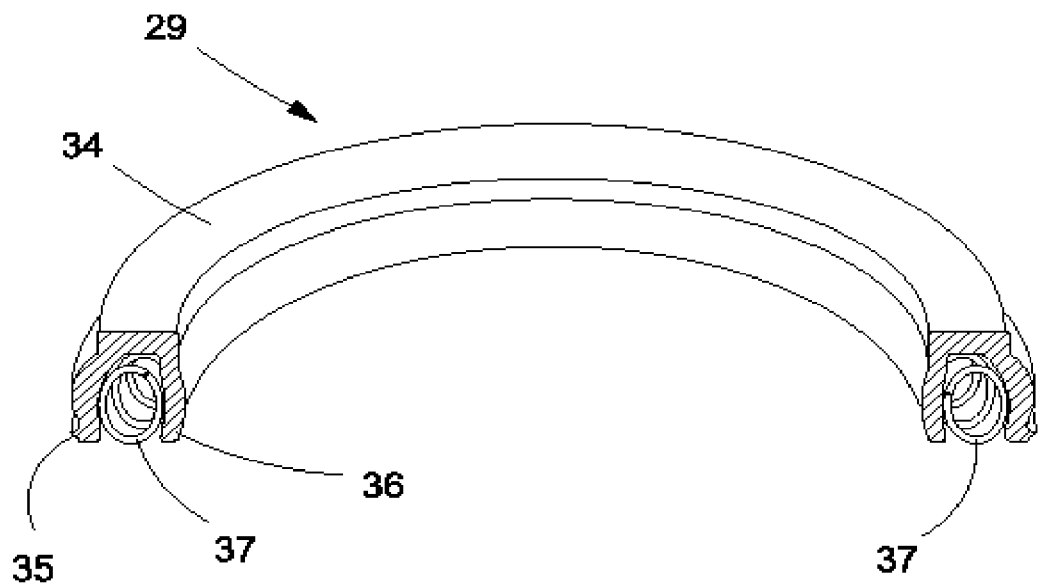
FIG. 5 is a sectional view of the spindle seal shown in FIG. 4.
Figure 6:
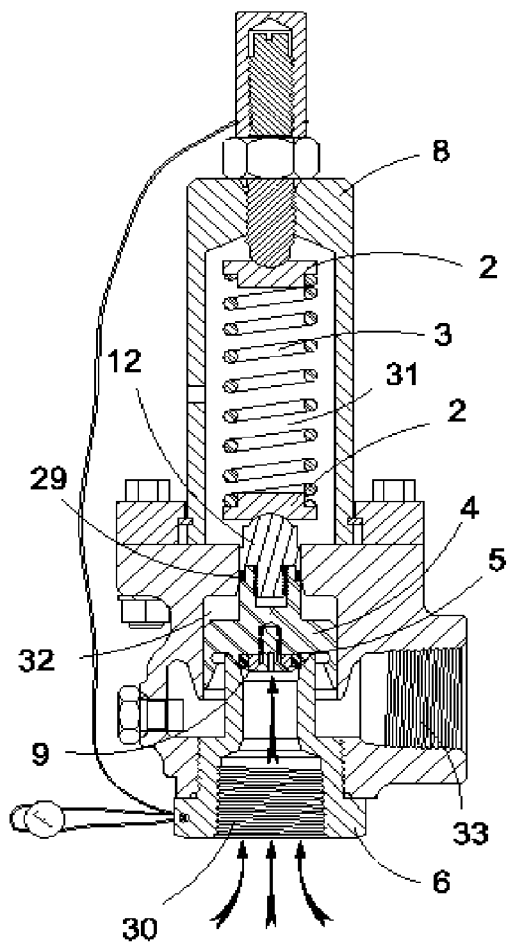
FIGS. 6 and 7 are side sectional views of the safety relief valve in the closed and open positions, respectively, for illustrating general flow patterns within the safety relief valve during normal operation.

Also referring to FIGS. 4 and 5, the spindle seal 29 is made up of a solid TEFLON® element consisting of a heel 34, outer sealing edge 35, and inner sealing edge 36. A spring 37, made of stainless steel or other metal suitable for the fluid process, fits inside the TEFLON® element and provides rigidity and outward force to place the sealing edges 35 and 36 against body surface 1b and spindle surface 4f. With the spindle seal assembly in place in the safety relief valve and exposed to a pressurized fluid, spring 3 serves to provide a downwardly acting force tending to block fluid present in inlet 30, and provide an additional force to cooperate with pressure within chamber 32 to expand sealing edges 35 and 36 into frictional sealing engagement with surfaces 1b and 4f against sealing edges 35 and 36. The style of spindle seal 29 used in this product has a maximum pressure rating of 10,000 psig.

The safety relief valve spring 3 exerts the downward force on spindle 4 to oppose the upward forces due to pressure at inlet 30. The amount of force exerted by the spring and, therefore, the valve set (opening) pressure is adjusted by turning pressure adjustment screw 10 with a wrench. Spring washers 2 provide an interface to transfer bearing forces between the spring 3 and pressure adjustment screw 10 at the top end of the spring, and between the spring and spindle cap 12 at the bottom end of the spring. The pressure adjustment screw is supported by female threads tapped into the top of bonnet 8. With the valve normally closed and in service, lock nut 11 and cap 18 are secured in place on the pressure adjustment screw along with lock wire 23 and lead seal 24 to prevent unauthorized or inadvertent adjustments to set pressure.

Holding the spring and spring washer subassembly stationary and in alignment with the lower internals is bonnet 8, held down with retaining ring 21 and bonnet base 14, the latter being clamped directly against the top of body 1 with bolts 13, lockwashers 26, and nuts 20. Not shown are clearance holes in items 1 and 14 used for positioning the bolts. In a version of this safety relief valve (not shown) intended for higher pressure service, bonnet 8 is a larger cast component that includes an integral lower bolting surface, so bonnet base 14 and retaining ring 21 are not used. The space 31 within the bonnet 8 is not exposed to system pressure due to the presence of spindle seal 29, which prevents escape of fluid upwardly from chamber 32.

The remaining sealing areas of the valve assembly are bushing seal 7 and rear seal 16, both usually made of TEFLON®. A bolt 15 plugs the rear of body 1 and holds seal 16 in place. A nameplate 25 is attached to the outside of body 1 to identify valve set pressure and identifying data.

Operation

A set or opening, pressure is specified by the user of the safety relief valve according to the operational parameters of their pipeline system, vessel, or tank. The value chosen corresponds to the point at which excess system pressure must be relieved, and is frequently the maximum allowable working pressure as defined by the governing piping or vessel design code.

Referring to FIGS. 1, 2, 6, and 7, when the system connected to the valve via inlet pipe 17 is operating at normal pressure, the safety relief valve remains closed below set pressure, due to the downward force established by spring 3, being greater than the upward force generated by pressure at inlet 30 acting over the total circular area enclosed by the sealing edge of valve seat 5. When inlet pressure rises to the point where the upward pressure force overcomes the downward spring force, valve seat 5 breaks contact with valve seat surface 6a and fluid flows through the valve from inlet 30 to outlet 33.

Figure 7:
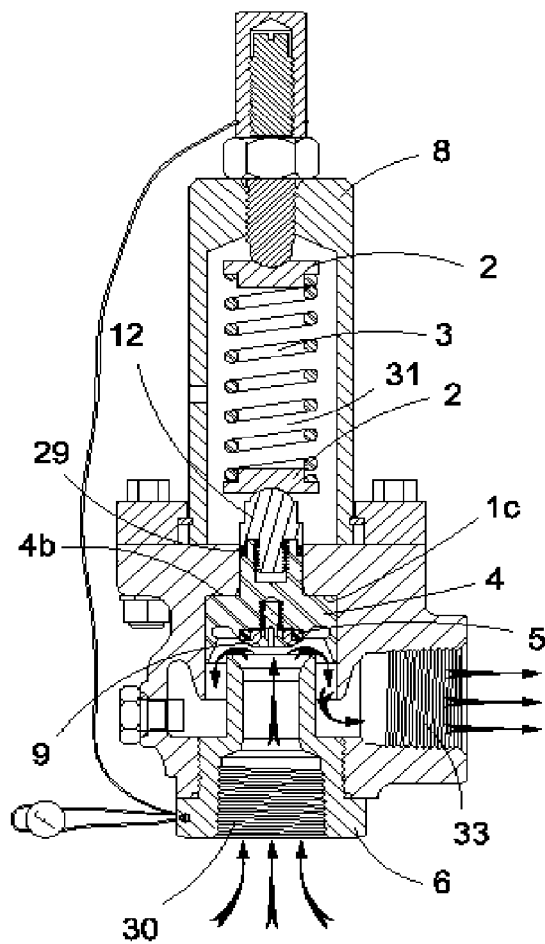

When the service fluid is a gas or vapor, the valve opening is rapid and characterized by a popping action, with spindle 4 immediately rising to the top of its travel such that the spindle upper surface 4b abuts against downwardly facing body surface 1c, as shown in FIG. 7. A rounded annular recessed area 4d, or huddling chamber, formed in the downwardly facing surface of spindle 4, most visible in FIG. 3, acts to let fluid quickly collect under the spindle after first flowing past valve seat surface 6a, leading to a further rapid pressure buildup distributed over an area much larger than the seat, resulting in the subsequent pop action. When the service fluid is a liquid and system pressure increase is slow, the initial opening is gradual and the liquid flow stream may be a small trickle. As inlet pressure is allowed to increase further, the liquid flow will gradually increase until, at approximately 7-½% above set pressure, the valve will pop the rest of the way open in a fashion similar to that when operating with a gas.

As excess system pressure abates, the reduced pressure at inlet 30 allows the downward spring force to overcome the upward pressure force, and the spindle 4 completes its downward travel into engagement with valve seat surface 6a. During valve closure, outlet pressure still exerting an upward force on spindle seal 29 not only continues to help effect a good seal at sealing edges 35 and 36 (FIG. 5), but also induces some drag between sealing edge 35 and the mating surface 1b of body 1 to resist the tendency the spindle may have to chatter, or cycle rapidly up and down due to fast changes in pressure distribution.

Figure 3:
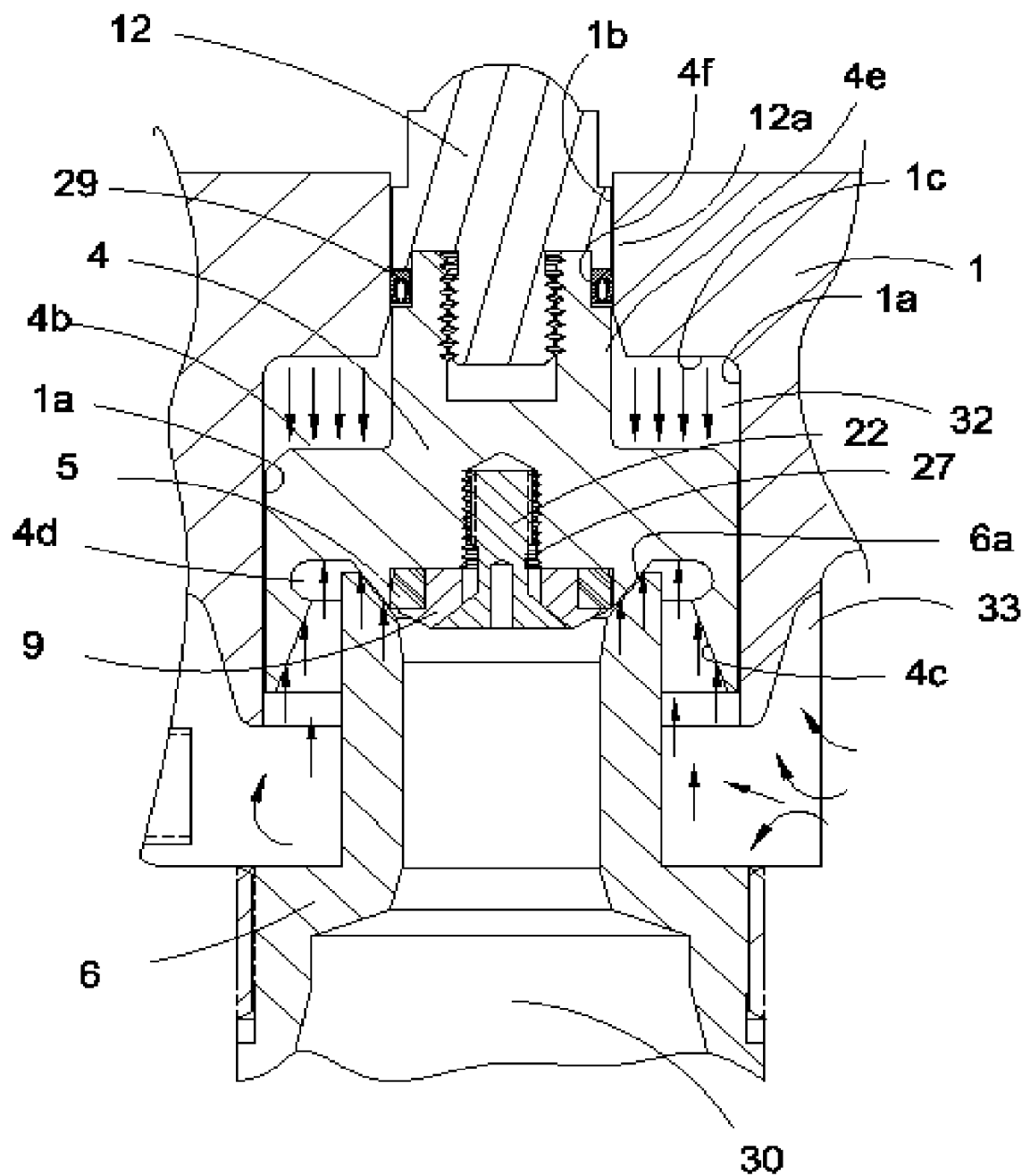
FIG. 3 is an enlarged sectional view of the safety relief valve nozzle, spindle, and seat region shown in FIG. 1, with an illustration of backpressure forces that may exist on the spindle with the valve in its closed position.

Referring to FIG. 3, the feature that enables this safety relief valve to be balanced against backpressure involves the provision of spindle with equal sized upwardly and downwardly facing areas 4c and 4b, which are exposed to back pressure present in outlet chamber 33, due to the flow communication provided between chambers 32 and 33.

The backpressure acting on the upper and lower surfaces of spindle 4 adds no net additional vertical force to the spindle, either up or down, and allows the spring setting alone to fix the valve set pressure and keep it stable.

We claim:

1. A balanced safety relief valve comprising:

a body formed with an interior chamber;

a flow inlet arranged to extend through one end of said body for flow communication with one end of said chamber and having an inner end bounded by a valve seat in flow outlet communicating with said one end of said chamber peripherally of said valve seat;

a guide opening disposed in alignment with said flow inlet and opening into an opposite end of said chamber through an opposite end of said body;

an elongated spindle means aligned with said flow inlet and having one end arranged to removably engage with said valve seat for removably preventing passage of fluid from said flow inlet into said chamber, an opposite end arranged to extend through said guide opening, and an enlarged mid-portion for dividing said chamber into said one and said opposite ends, characterized in that first and opposite surfaces of said mid-portion of said spindle face towards said one end and said opposite end of said chamber, respectively, and have equal surface areas in a direction facing lengthwise of said spindle means;

means for biasing said one end of said spindle into engagement with said valve seat for removably blocking flow of fluid into said chamber from said flow inlet, said biasing means tending to establish a set point at which said spindle means will disengage from said valve seat and permit flow of fluid from said inlet into said chamber for discharge through said outlet;

means establishing a fluid flow path placing said outlet in flow communication with said opposite end of said chamber for establishing a force acting on said opposite end of said spindle means equal and opposite to a force exerted on said one end of said spindle means due to pressure with said outlet, whereby to balance said valve and prevent the changes in pressure in said outlet from effecting changes in said set point; and a fluid seal engaging with said body and said spindle means, for preventing passage of fluid from said opposite end of said chamber outwardly of said body through said guide opening;

wherein said spindle means include a first part defining said one end and said mid-portion of said spindle means, and a spindle cap fixed to said mid-portion and cooperating therewith to locate said fluid seal lengthwise of said spindle means within said guide opening.

2. A valve according to claim 1, wherein said fluid flow path is an annular flow path defined by concentrically arranged cylindrical surfaces of said chamber and said mid-portion of said spindle means.

3. A valve according to claim 2, wherein said fluid seal includes an annular Teflon sealing member of U-shaped cross section having a heel connected to outer and inner annular sealing edges arranged for sealing engagement with said body and said spindle means, said sealing member opening towards said chamber, and seal spring means disposed to extend annularly within said sealing member intermediate said sealing edges.

4. A valve according to claim 1, wherein said one end of said spindle means is provided with an annular recessed area arranged for flow communication with said outlet radially outwardly of said valve seat to allow fluid flowing into said chamber from said flow inlet to collect against said one end of said spindle means initially upon opening of said valve.

* * * * *